(12) United States Patent  
Nobileau

(10) Patent No.: US 9,051,789 B2  
(45) Date of Patent: Jun. 9, 2015

(54) HIGH COLLAPSE RESISTANCE SOLID EXPANDABLE TECHNOLOGY

(76) Inventor: Philippe Constant Nobileau, Villefranche sur Mer (FR)

( * ) Notice: Subject to any disclaimer, the term of this patent is extended or adjusted under 35 U.S.C. 154(b) by 710 days.

(21) Appl. No.: 13/311,425

(22) Filed: Dec. 5, 2011

(65) Prior Publication Data

US 2012/0145409 A1     Jun. 14, 2012

Related U.S. Application Data

(63) Continuation-in-part of application No. 10/416,773, filed on Jul. 6, 2005, now Pat. No. 7,490,676, and a continuation-in-part of application No. 11/953,335, filed on Dec. 10, 2007, now Pat. No. 8,069,900.

(51) Int. Cl.

| | | |
|---|---|---|
| *E21B 43/10* | (2006.01) | |
| *E21B 33/14* | (2006.01) | |
| *E21B 17/08* | (2006.01) | |
| *E21B 17/14* | (2006.01) | |
| *E21B 33/12* | (2006.01) | |
| *E21B 41/00* | (2006.01) | |
| *F16L 55/165* | (2006.01) | |

(52) U.S. Cl.  
CPC ............... *E21B 17/08* (2013.01); *E21B 17/14* (2013.01); *E21B 33/1212* (2013.01); *E21B 33/14* (2013.01); *E21B 41/0042* (2013.01); *E21B 43/103* (2013.01); *E21B 43/105* (2013.01); *F16L 55/1657* (2013.01)

(58) Field of Classification Search  
USPC .......................................... 166/207, 380, 277  
See application file for complete search history.

(56) References Cited

U.S. PATENT DOCUMENTS 5,918,677 A * 7/1999 Head .............................. 166/380  
7,178,601 B2 * 2/2007 Burge ........................... 166/380

FOREIGN PATENT DOCUMENTS

WO     WO 02086286 A2 * 10/2002

* cited by examiner

*Primary Examiner* — Giovanna C Wright

(57) ABSTRACT

Composite tubular casing with hardened material between thin pipe-in-pipe increasing the bending capability of the casing wall delivers high collapse resistance. Solid Expandable technology allows substantial wellbore slimming at the expense of collapse resistance. By combining both technologies, cost effective high collapse resistance wellbore construction can be achieved.

9 Claims, 2 Drawing Sheets

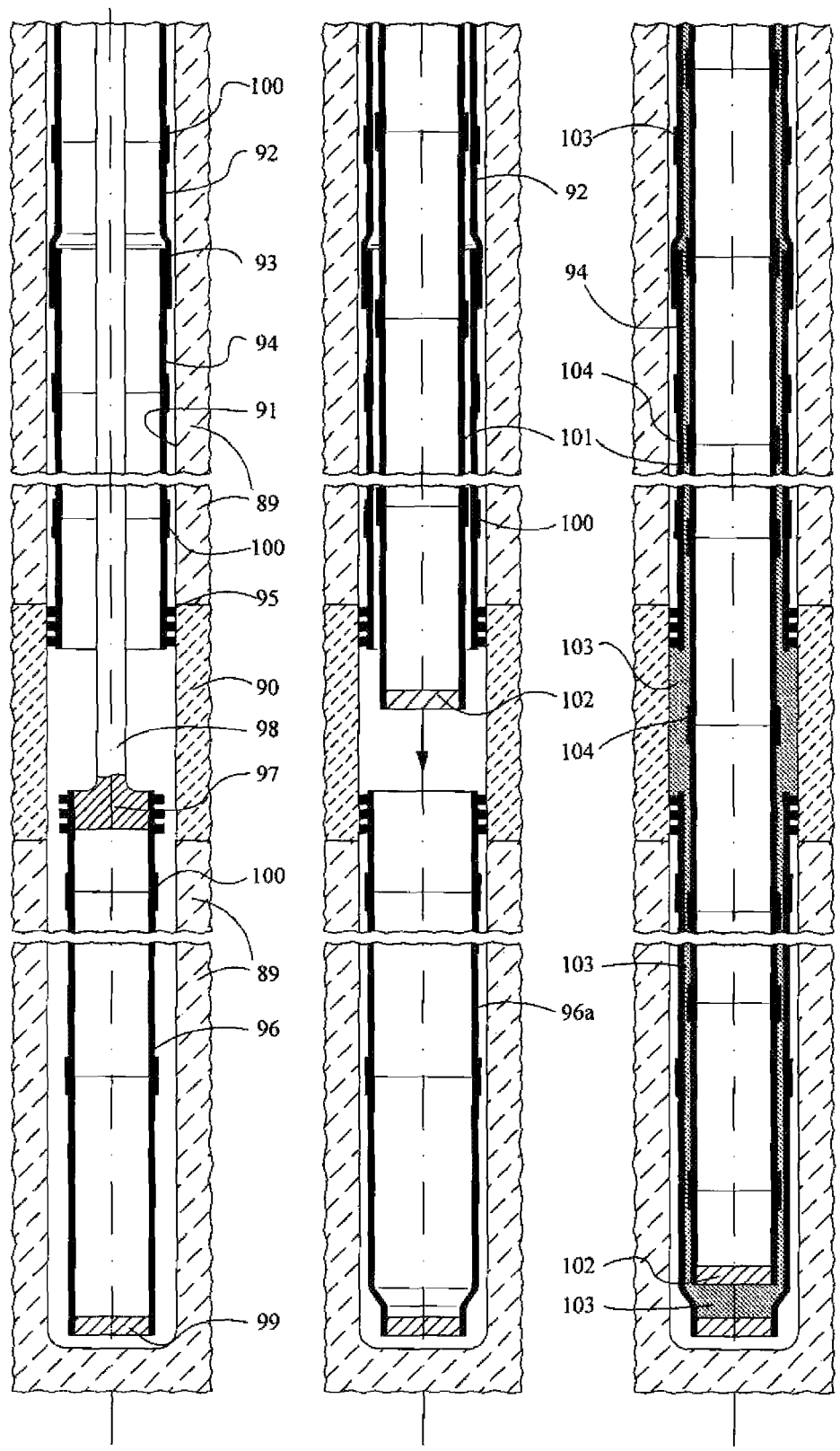

HIGH COLLAPSE RESISTANCE SOLID EXPANDABLE TECHNOLOGY

CROSS-REFERENCE TO RELATED APPLICATION

This application is a continuation in part of application Ser. No. 10/416,773 filed Oct. 8, 2001 now U.S. Pat. No. 7,490,676 and a continuation in part of application Ser. No. 11/953,335 filed Dec. 10, 2007 now U.S. Pat. No. 8,069,900. The entire disclosures of the prior applications are incorporated herein by this reference.

TECHNICAL FIELD

The present invention relates to well casing requiring mechanical performances enhancement mostly in collapse resistance in-situ or after installation.

BACKGROUND ART

New methods for installation of tubular structures in well have recently been introduced like solid expandable systems but have reduced mechanical performances, mostly in collapse resistance.

The U.S. Pat. No. 7,159,666 and U.S. Pat. No. 8,069,900 of the applicant, offer slimming capability without collapse resistance reduction, but at the expense of a radical change of practice which create a substantial barrier entry.

DISCLOSURE OF INVENTION

The purpose of the invention is to enhance the mechanical performances of Solid Expandable Technology by having the external thin casing installed with solid expansion technology cooperating with an internal thin gas tight integral string for a strong collapse resistance wellbore construction.

BRIEF DESCRIPTION OF DRAWINGS

The purposes, objects and characteristics of the invention will be more apparent after reading the description which follows referring to the drawings in which:

FIGS. 1 to 3 are sequence views of a well cased with Monobore solid expandable technology enhanced, after TD has been reached, in collapse resistance by composite tubular configuration according to a first embodiment of the invention.

DETAILED DESCRIPTION

Figures 4, 5, 6:
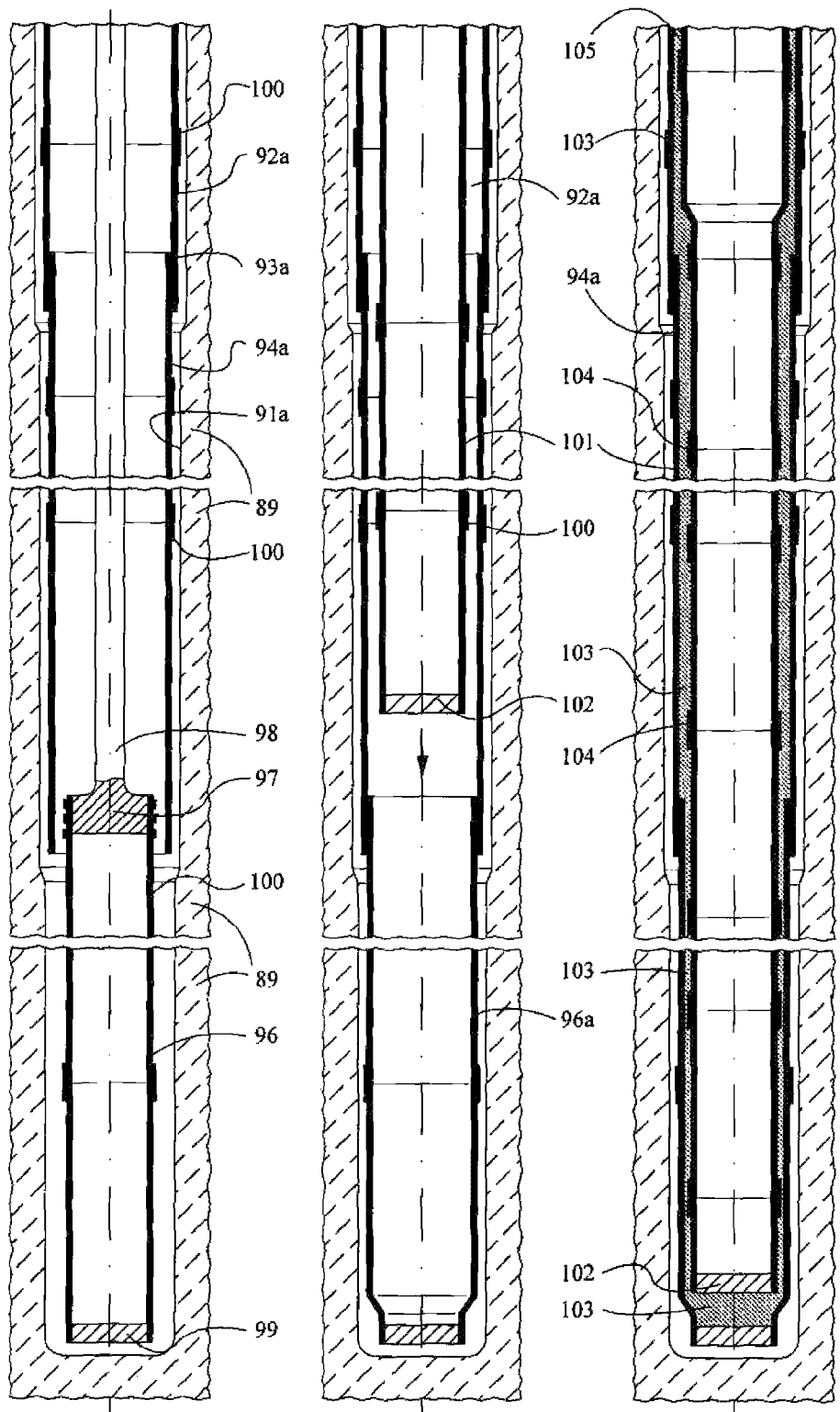
FIGS. 4 to 6 illustrate a simplified alternative adapted to non Monobore solid expandable.

To make the understanding of the following description easier, we will use the term longitudinal when it is parallel to the direction of the tubular structure, and the term radial to indicate that it is somewhat in the plan perpendicular to the direction of the tubular structure. For casing applications, acknowledging that the string went down in the well vertically, we will use top, bottom, downward, upward, upper or lower.

It is common knowledge that collapse resistance is increased when the ratio of T (Wall Thickness) over D (Diameter) increases.

On another hand, radially enlarged solid steel pipe which characterize the Solid Expandable technology has a tendency to decrease the casing wall thickness and further decrease the collapse resistance due to the Bauschinger effect.

But by filling with hardenable material the annulus space between two thin wall concentric casings, the combined T/D (T=Wall Thickness over Diameter) increases substantially and so the collapse resistance.

Referring to FIG. 1, a well 91 has been drilled. To illustrate the possible variation we assume that the well has been drilled through impervious ground zone 90 (consolidated rock) and permeable ground zone 89. The well has been cased by known solid MonoBore expandable casing with a first length of casing 92 having a bottom bell 93 receiving a second expandable casing 94 featuring a packing seal 95 at the bottom to achieve sealing arrangement with impervious ground zone 90. A third length of casing 96 (not expanded yet) is shown being run on running tool 97 connected to running string 98. All these length of casing are made from the assembly of straight length of round pipe with known T/C coupling 100. Presently when T/C coupling are expanded in the plastic range, they loose their gas-tight capability.

Referring to FIG. 2, the third length of casing 96a has been expanded and the top sealed to sealed ground zone 90. It will be recognized by the man skilled in the art that the presence of impervious ground zone 90 is not mandatory to achieve the composite tubular according to the invention and if impervious ground zone 90 are not considered to simplify length of casing connections, a bell type connection arrangement between first length 92 et second length 94 can be installed between second length 94 and third length 96a.

Then assuming that third length is the last casing, the well having reached the producing zone, a final length of casing 101 is lowered to cover the three previous lengths 92, 94 and 96a. This final length of casing 101 could have advantageously the same manufactured size than the three others. Centralizing of the casings can be achieved with the coupling 104 protuberance featuring possibly some flow-by slits or conventional casing centralisers.

Hardenable material 103 like cement is circulated between the fourth length of casing 101 preferably from the bottom up via the cement shoe 102 and the 3 previous lengths 92, 94 and 96a to built a high performance sandwich wall. Since the T/C couplings 104 of the fourth length of casing 101 have not been expanded, they retain their gas-tight capability offering a gas-tight production casing. This composite/sandwich configuration illustrated in FIG. 3 is very advantageous because it requires only thin wall casing to be installed which are more easily set as MonoBore/MonoDiameter expandable casing reducing the percentage of strain required for their installation.

Again, cementing of the outer casing 92, 94 and 96a to the drilled hole is not necessary to achieved the High Performance capability composite tubular structure according to the invention, only the space between the inner casing 101 and the three outer casing 92, 94 and 96a must be filled with a hardenable material. In case of outer casing interruption due to the presence of impervious ground layer 90, the sandwich structure is then achieved by using the consolidated sealed terrain as outer layer but its strength have been verified and the pollution of the cement is minimum which is not the case when the cement goes in contact with permeable ground.

Referring to FIG. 4, a simplified alternative without using MonoBore configuration is illustrated. The need of installing bell 93 is removed and the configuration is well suitable in case of well reentry.

Second and third casing 92a and 94a are set as liner of their preceding casing, the solid expandable technology being mostly used to reduce the bore radius losses due to casing coupling 100 clearance.

The internal string 101 is not expanded and therefore retains its gas tight capability and can be part of a mixed diameter string with enlarged casing size 105 due to the staggered outer casing diameter.

To compensate for hardening material setting shrinkage and it is also considered advantageous to maintain pressure and continue supplying hardenable material while setting or curing. A substantial pressure of a minimum of 60% of the well capability is advantageous.

While the improvements by creating composite tubular structure downhole has been shown in some of its forms, it should be apparent to those skilled in the art that it is not so limited, but it is susceptible to various changes without departing from the scope of the invention.

The invention claimed is:

1. High collapse resistance composite tubular structure for casing a well including a first length of casing having an internal diameter and below said first length of casing at least a second length of casing, lowered through said first length of casing, said second length of casing having substantially the same said internal diameter after solid expansion, wherein a composite tubular structure is formed by the cooperation of the existing casings with a final length of non-expanded, casing of smaller diameter (101) covering at least two previous casings, the cooperation being done by a hardenable material (103) set in the annulus between said existing casings and said final length of casing of smaller diameter.

2. Structure according to claim 1, wherein said second length(s) of casing is expanded with an expansion tool increasing by plastic deformation the diameter of said length of casing.

3. Structure according to claim 2, wherein the expansion is facilitated by applying pressure with the mechanical action of said expansion tool.

4. Structure according to claim 1, wherein said hardenable material is circulated in place.

5. Structure according to claim 1, wherein said final length of casing of section is installed after said second length of casing is expanded.

6. A method to construct an underground wellbore having a high collapse resistance pipe-in-pipe section comprising the steps of:
  lowering a first length of casing;
  lowering at least a second length of casing through said first length of casing;
  expanding said second length of casing;
  lowering a final non-expanded length of casing, having a smaller diameter, covering at least part of said first and said second length;
  circulating a hardenable material located between said first and second lengths of casing and said final non-expanded length of casing to achieve structural cooperation between expanded and non-expanded casing.

7. A method according to claim 6, wherein the expansion of said second length of casing is done by solid expandable technology.

8. A method according to claim 6, wherein said second length of casing is expanded to the same internal diameter than said first length of casing.

9. A method to construct an underground wellbore having a high collapse resistance pipe-in-pipe section comprising the steps of:
  lowering a first length of casing;
  lowering at least a second length of casing through said first length of casing;
  lowering a final non-expanded length of casing, having a smaller diameter, covering at least part of said first and said second length;
  circulating a hardenable material located between said first and second lengths of casing and said final non-expanded length of casing to enhance collapse resistance after hardening;
  feeding and maintaining a pressure in the hardenable during hardenable material setting.

* * * * *